PROCESS FOR THE MANUFACTURE OF METHYL METHACRYLATE

Albert Bouniot, Melle, France, assignor to Rhone-Progil, Paris, France
No Drawing. Filed June 19, 1972, Ser. No. 263,846
Claims priority, application France, June 17, 1971, 7122946
Int. Cl. C07c 69/54
U.S. Cl. 260—486 D    19 Claims

ABSTRACT OF THE DISCLOSURE

The continuous manufacture of methyl methacrylate by heating β-methoxy isobutyric acid in the presence of a catalyst of aryl sulfonic acid and with the continuous addition of water.

---

This invention relates to the manufacture of methyl methacrylate from β-methoxy isobutyric acid.

It is known that, by heating a β-alkoxy alkanoic acid under certain conditions, it is possible directly to obtain an α,β-olefinic acid ester. Considering the heat conversion of β-methoxy isobutyric acid to methyl methacrylate, the total reaction may be written as follows:

In fact, two successive reactions take place during this process: first, β-methoxy isobutyric acid decomposes into methacrylic acid and methanol, and then esterification of the methacrylic acid by the methanol. Accordingly, to achieve the operation, it is necessary to use catalysts and to bring into play operating conditions which allow these two reactions to proceed.

It has been proposed, more particularly, to operate in liquid phase in a reaction medium or bath containing, as the catalyst, an aryl sulfonic acid, preferably p-toluene sulfonic acid, or benzene sulfonic acid, the bath being heated, for example, to a temperature within the range of 100°–170° C., and being continuously fed with β-methoxy isobutyric acid. The methyl methacrylate and the water are continuously distilled from the bath, resulting in easy recovery therefrom.

The present invention is addressed to an improvement in the continuous process for converting β-methoxy isobutyric acid to methyl methacrylate. In accordance with the invention, there is continuously fed to the reaction bath, water together with the β-methoxy isobutyric acid. It has been found that the continuous presence of an amount of water in the bath increases the methyl methacrylate production rate and yield as well as the active life of the bath. In the absence of introduction of water into the bath, the amount of water formed by the reaction is not sufficient to insure the continuous presence of water because it is entrained for removal from the bath by azeotropic distillation and, consequently, the bath is usually substantially anhydrous. Under such conditions, polymerization side reactions become significant in the bath, causing accelerated inactivation thereof. Moreover, the decomposition reactions of the β-methoxy isobutyric acid and of the methyl β-methoxy isobutyrate formed in the bath, which reactions probably proceed through an intermediate step of hydrolysis to methanol and β-methoxy isobutyric acid and to methanol and methyl β-hydroxy isobutyrate, respectively, followed by an intermediate step of dehydration to methacrylic acid and methyl methacrylate, respectively, take place much more slowly in the absence of traces of water and the total reaction rate is accordingly affected.

The permanent presence of water, effected by continuous introduction thereof into the bath, in accordance with the present invention, enables the above mentioned drawbacks substantially to be overcome.

This favorable effect derived from the additional amount of water, even though low, is all the more surprising a priori since in a similar reaction, in the manufacture of methyl acrylate from β-methoxy propionic acid, a continuous introduction of water is not only unnecessary, but is even detrimental.

This difference in behavior between the two reactions may be explained by the fact that, in the case of the acrylate, there is formed 0.21 kg. of water per kg. of ester and the distillation of the azeotropic mixture of water-methyl acrylate removes only 0.07 kg. of water per kg. of acrylate. As a result, the bath does not tend to become anhydrous. On the other hand, in the case of the methacrylate, there is formed 0.18 kg. of water per kg. of ester, which water can be entrained substantially entirely in the azeotropic mixture of water-methyl methacrylate distilled from the bath, including in addition the small amount of water continuously entrained by issuance from the bath, through distillation, of some methyl β-methoxy isobutyrate present therein. It is understandable that the bath remains permanently anhydrous, with all of the drawbacks resulting therefrom.

Preferably, the amount of water to be continuously introduced to the reaction bath, in accordance with the practice of this invention, is, per unit of time, 2% to 15% of the weight of β-methoxy isobutyric acid fed over the same period of time, with the preferred amount being within the range of 4% to 7% by weight.

It should be noted that, if the amount of water in the bath is too high, the water will azeotropically entrain methyl β-methoxy isobutyrate which then should be separated from the distillate and returned to the bath. That is why there is no particular value in the introduction into the bath of more than 15% by weight of water with respect to the β-methoxy isobutyric acid.

The above figures for the amounts of water to be introduced are for an operation carried out at substantially atmospheric pressure. In the event that a materially different pressure is employed, it may become necessary to adjust the amount of water to be introduced, depending somewhat on the pressure employed.

The following examples are given by way of illustration, but not by way of limitation, of the preferred operating conditions for carrying out this invention.

The apparatus is a conventional reaction vessel provided with heating means and a rectification column for separation of effluent by distillation. At equilibrium conditions, the reaction medium contains 5% to 60% by weight, more particularly 30% by weight, aryl sulfonic acid, more particularly p-toluene sulfonic acid, as a catalyst. The remainder of the bath consists essentially of β-methoxy isobutyric acid and methyl β-methoxy isobutyrate.

The bath is heated to maintain the temperature within the range of 100°–170° C., more particularly 140°–150° C. A mixture composed mainly of methyl methacrylate, water, methanol and methyl β-methoxy isobutyrate is continuously distilled off and the methyl β-methoxy isobutyrate is returned after separation by rectification. The methyl β-methoxy isobutyrate continuously decomposes in the bath to methyl methacrylate and methanol.

The volume of the bath is maintained constant by continuously adding β-methoxy isobutyric acid and water, and preferably methanol is also added, so that the total amount of ingredients added per unit time corresponds to the total amount of product withdrawn over the same period of time. The amount of methanol introduced is with the range of 0.1 to 0.8 parts by weight and preferably 0.3 parts by weight, per part by weight of β-methoxy isobutyric acid that is fed. The methanol finds its way into the vapors issuing from the bath, and, upon separation by rectification, is returned to the methanol feed. This methanol prevents the bath from becoming rich in methacrylic acid, which tends to polymerize in such medium. For this purpose, the methanol need not be pure methanol, but instead may contain hydrocarbons, such as hexane, which is capable of assisting the subsequent methanol separation by azeotropic distillation.

Besides the various components mentioned above, the reaction bath may contain one or more stabilizers to limit polymerization side reactions. For this purpose, use can be made, for example, of hydroquinone, methylene blue, copper salts and the like.

Besides polymerization, a side reaction which often occurs in the bath is the etherification of some methanol to form dimethyl ether. The resulting methanol loss is compensated by adding a corresponding amount of methanol in the methanol feed to the bath.

The following example illustrates the process of this invention, compared with the conventional technique without water feed.

EXAMPLE

*Experiment A.*—The operation is carried out in a balloon of 2 liters capacity containing a reaction bath capacity of 1 liter and is surmounted by a column containing Raschig rings as filling materials to limit the liquid entrainments in droplet form. The swan-neck at the top of the column directs the vapors issuing therefrom to a continuously operated rectification column for separation of the components from one another and return of the methyl β-methoxy isobutyrate directly to the reaction bath.

After the operation is started and equilibrium is achieved, the bath has approximately the following composition:

| | Percent by wt. |
|---|---|
| p-toluene sulfonic acid | 30 |
| β-methoxy isobutyric acid | 10 |
| Methyl β-methoxy isobutyrate | 57 |
| Methacrylic acid | 3 |

The bath is maintained at a temperature of 150° C. and the following reactants are continuously fed thereto:

| | G. per hour |
|---|---|
| β-Methoxy isobutyric acid | 92 |
| Methanol | 30 |

No water is fed to the bath. This operation corresponds to the conventional technique, not to the present invention.

The vaporous mixture introduced via the swan-neck to the continuously operated rectification column is separated therein into its constituents, to wit, methanol which is returned to the methanol feed to the bath, methyl methacrylate which is collected, water which is discarded, and entrained methyl β-methoxy isobutyrate which is directly refluxed into the bath. There remains some dimethyl ether which cannot be condensed under the operating conditions and is exhausted in gaseous state to the atmosphere. The amount of methyl β-methoxy isobutyrate refluxed to the bath is about 10 g. per hour.

The yield from the balanced operation is as follows:

| | G. per hour |
|---|---|
| Methyl methacrylate | 75 |
| Water | 15 |
| Dimethyl ether | 2 |
| Methanol | 27 |

It is found that 3 g. per hour of methacrylic polymers accumulates in the bath. These figures indicate a methyl methacrylate yield of 96.2%.

After the apparatus has run for 100 hours under these conditions, the productivity of the bath is only 55 g. per hour of methyl methacrylate, i.e. a decrease of almost 27%.

*Experiment B.*—The operation is carried out in the same apparatus as Experiment A. At operating equilibrium the bath has practically the same composition as in Experiment A, the only difference being that, because of the continuous water feed to the bath as will be described below, the bath contains some traces of water which cannot be accurately determined but are not above some tenths of percent by weight (approximately from 0.1% to 0.3%).

The bath was maintained at a temperature of 150° C. and the following reactants were introduced continuously:

| | G. per hour |
|---|---|
| β-Methoxy isobutyric acid | 119 |
| Water | 6 |
| Methanol | 40 |

The yield of product from the reactor was as follows:

| | G. per hour |
|---|---|
| Methyl methacrylate | 100 |
| Water | 25 |
| Methanol | 36.5 |
| Dimethyl ether | 2.5 |

About 20 g. per hour of methyl β-methoxy isobutyrate is refluxed to the bath. Only 1 g. per hour of polymers accumulates in the bath. A methyl methacrylate yield of 99.1% is obtained.

After the apparatus has run for 100 hours under these conditions, the productivity of the bath is as high as 90 g. per hour of methyl methacrylate, i.e. a decrease of only 10%.

I claim:

1. In a process for the continuous manufacture of methyl methacrylate by heating β-methoxy isobutyric acid in the presence of an aryl sulfonic acid as a catalyst, in a reaction bath continuously fed with β-methoxy isobutyric acid while continuously distilling off from the bath the methyl methacrylate and water formed by the reaction, the improvement in which water and methanol are continuously fed to the reaction bath together with the β-methoxy isobutyric acid with the water being added at a rate of 2% to 15% by weight of the β-methoxy isobutyric acid and with methanol being added at a rate of 0.1 to 0.8 part by weight per part by weight of β-methoxy isobutyric acid.

2. A process as claimed in Claim 1, wherein the aryl sulfonic acid is p-toluene sulfonic acid.

3. A process as claimed in Claim 1, wherein the aryl sulfonic acid is benzene sulfonic acid.

4. A process as claimed in Claim 1, wherein the reaction bath under equilibrium operating conditions comprises 5% to 60% by weight of aryl sulfonic acid, the remainder of the bath consisting mainly of β-methoxy isobutyric acid and methyl β-methoxy isobutyrate.

5. A process as claimed in Claim 4, wherein the reaction bath comprises about 30% by weight of aryl sulfonic acid.

6. A process as claimed in Claim 1, wherein the reaction bath is maintained at a temperature of 100°–170° C.

7. A process as claimed in Claim 1, wherein the reaction bath is maintained at a temperature of 140°–150° C.

8. A process as claimed in Claim 1, in which, when the reaction is carried out at a pressure above atmospheric, the amount of water added is adjusted according to the reaction pressure.

9. A process as claimed in Claim 1, in which the amount of water continuously fed to the reaction bath, during a period of time, when the reaction is carried out at atmospheric pressure, is within the range of 4% to 7% by weight of the β-methoxy isobutyric acid fed during the same period of time.

10. A process as claimed in Claim 1, which includes the step of rectifying the mixture of products distilled from the reaction bath for separating the components one from another and recovering the methyl methacrylate.

11. A process as claimed in Claim 1, in which the amount of methanol fed to the bath is about 0.3 part by weight per part by weight of β-methoxy isobutyric acid fed.

12. A process as claimed in Claim 10, in which the methanol separated by rectification is recycled to the methanol feed to the bath.

13. A process as claimed in Claim 1 wherein the methanol etherified to dimethyl ether and in which the amount of methanol lost in this way is compensated by addition of a corresponding amount of methanol to the methanol feed to the bath.

14. A process as claimed in Claim 1, in which the methanol is introduced with a hydrocarbon which forms an azeotrope which distills off with the methanol.

15. A process as claimed in Claim 14, in which the hydrocarbon is hexane.

16. A process as claimed in Claim 10, in which the methyl β-methoxy isobutyrate separated by rectification is re-cycled to the reaction bath.

17. A process as claimed in Claim 1, in which the reaction bath contains one or more stabilizers to minimize the polymerization side reactions.

18. A process as claimed in Claim 17, in which the stabilizer is selected from the group consisting of hydroquinone, methylene blue and copper salts.

19. A process as claimed in Claim 10, in which the total amount of material fed to the reaction bath, per unit time, corresponds to the amount of products withdrawn from the reaction bath during the same period of time.

References Cited

FOREIGN PATENTS 626,622  12/1962  Belgium _____ 260—486 D

LORRAINE A. WEINBERGER, Primary Examiner

P. J. KILLOS, Assistant Examiner